United States Patent Office 2,744,098
Patented May 1, 1956

2,744,098

COPOLYMERS OF VINYL COMPOUNDS WITH α,β-UNSATURATED DICARBOXYLIC ACIDS

Richard S. Towne, Plainfield, N. J., assignor to General Aniline & Film Corporation, New York, N. Y., a corporation of Delaware No Drawing. Application October 25, 1951,
Serial No. 253,217

12 Claims. (Cl. 260—78.5)

This invention relates to an improved process of preparing copolymers of vinyl compounds with polymerizable acid anhydrides and esters of the maleic type.

Copolymers of α,β-unsaturated dicarboxylic acids with vinyl compounds are well known and widely utilized in various industries. Such copolymers are described in United States Patent 2,047,398. The process involves heating the copolymerizable components either under pressure or reflux. The resulting polymers range from flaky solid masses to hard blocks. These properties are attributable to the fact that the copolymerizable components are polymerized to a considerably high degree, i. e., high molecular weight.

Such copolymers also may be prepared by the process described in United States Patent 2,230,240, wherein the temperature of the reacting mass is maintained below the boiling point of the vinyl compound. The products obtained are also hard and dense resinous masses of high molecular weight.

Another method of preparing such copolymers, as described in United States Patent 2,179,040, consists of bubbling a gaseous vinyl compound, such as vinyl chloride or methyl vinyl ether, through a high column of an organic solvent, such as benzene, ethylene chloride, and the like, or mixtures thereof, containing maleic anhydride and a polymerization catalyst and heating the reaction mixture at a raised temperature, i. e., at a temperature usually below the boiling point of the solvent or other liquid vehicle utilized for the reaction components. The products obtained are fine grain copolymers of very high molecular weight.

The copolymers obtained by the foregoing processes because of their high molecular weight and having a specific viscosity of 2 to 6 (based on 1 gram of the copolymer per 100 ml. of methyl ethyl ketone solution) cannot be utilized where there is a need for a low viscosity material which permits the use of high solid solutions, such as in the stuffing of leather, high solid adhesive compositions and the like. Since the application of the copolymers to these materials call for a specific viscosity in the range of 0.02 to 1.2, it is an essential prerequisite that the copolymer be of low molecular weight.

Accordingly, it is an object of the present invention to provide a process of preparing such molecular weight copolymers.

Other objects and advantages will appear hereinafter.

We have found that powdery low molecular weight copolymers fulfilling the above requirements are readily prepared by first heating to reflux a solution of an acid anhydride or ester of the maleic acid type in an inert organic solvent-diluent in the presence of a peroxide catalyst. The solution is stirred and a vinyl compound, such as, for example, vinyl halide, vinyl ether, vinyl ester, and the like, is added to the solution as such or dissolved in an inert organic solvent. A polymeric precipitate appears within a few minutes and the introduction of the vinyl compound is continued for a period of time ranging from 2 to 12 hours. The vinyl compound is added at such a rate that the polymerizable maleic acid type anhydride or ester is in substantially large excess over the vinyl compound throughout the major portion of the reaction. The slurry after filtering, washing with an inert organic solvent, and drying in vacuo, is recovered. The final product is of low molecular weight, powdery in form, and has a specific viscosity ranging from 0.02 to 1.2 (based on 1 gram of the copolymer per 100 ml. of methyl ethyl ketone).

The slow addition of the vinyl compound to the boiling solution of the polymerizable maleic acid type compound is the unusual and unexpected feature which influences the formation of the low molecular weight copolymers. The reflux temperature depends upon the boiling point of the organic solvent-diluent employed which must be above the boiling point of the vinyl compound. In selecting any inert organic solvent, this point must be borne in mind. For example, if the vinyl compound is gaseous at room temperature, such as methyl vinyl ether or vinyl chloride, the inert solvent chosen must have a boiling point above that of the vinyl compound. In other words, depending upon the inert solvent-diluent employed, the polymerization temperature is at or near the boiling point of the solvent diluent.

The boiling point of methyl vinyl ether is 5° C. If benzene, whose boiling point is about 80° C., is employed as the solvent-diluent, the polymerization temperature will be above the boiling point of the methyl vinyl ether. The latter will not boil away too rapidly during the polymerization reaction because its vapor pressure will be lowered by the benzene. If vinyl isobutyl ether, whose boiling point is 83° C., is added to the refluxing solution as such or in solution with an inert solvent-diluent, such as, for example, 25:75 mixtures of normal heptane and toluene, the ether will not boil away because the vapor pressure of the ether will be lowered by the solvent-diluent mixture, the constituents of which have boiling points of 98° C. and 114° C., respectively. By choosing a solvent-diluent or a mixture of solvent-diluents whose boiling point is higher than the boiling point of the vinyl compound, the polymerization reaction is conducted at a temperature above the boiling point of the vinyl compound.

If the vinyl compound is a liquid or solid, the solvent-diluent employed, if desired, may be the same as that employed for the maleic acid type compound and whose boiling point must be above the boiling point of the vinyl compound. Whether the vinyl compound is gaseous, liquid, or solid at room temperature, it is desirable that it be slowly introduced to the refluxing solution of the maleic acid type compound and peroxide catalyst. The amount of peroxide catalyst may range from 0.1 to 3% based on the weight of the maleic acid type anhydride or ester.

The maleic acid type anhydrides and esters which are copolymerized with the vinyl compound in accordance with the foregoing procedure are characterized by the following general formulae:

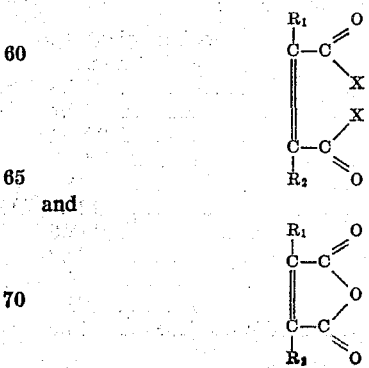

and wherein $R_1$ and $R_2$ represent either hydrogen, halogen, e. g., chlorine or bromine, a lower alkyl, such as methyl, ethyl, propyl, isopropyl, butyl, etc., aryl or aralkyl radical, e. g., phenyl, benzyl, etc., and X represents either oxyalkyl or oxyaryl in which the alkyl and aryl groups have the same values as in $R_1$ and $R_2$.

As illustrative compounds embraced by the foregoing formulae, the following anhydrides may be mentioned:

- Maleic acid
- Ethyl maleic acid
- Phenyl maleic acid
- Benzyl maleic acid
- Dibenzyl maleic acid
- Chloromaleic acid
- Citraconic acid including the lower alkyl esters thereof, such as, for example:

- Maleic acid ethyl ester
- Phenyl maleic methyl ester
- Chloromaleic propyl ester
- Citraconic butyl ester and the like.

The polymerizable vinyl compound may be any one of the type commonly employed in polymerization reaction and having a single vinyl group, $>C=CH_2$. As illustrative examples of such compounds, the following may be mentioned:

- Methyl vinyl ether
- Ethyl vinyl ether
- Isopropyl vinyl ether
- n-Propyl vinyl ether
- Isobutyl vinyl ether
- Butyl vinyl ether
- Vinyl chloride
- Vinyl bromide
- Vinyl acetate
- Vinyl formate
- Acrylic acid The peroxide catalyst may be any one of the type employed in polymerization reactions, such as:

- Acetone peroxide
- Acetyl peroxide
- Benzoyl peroxide
- Butyryl peroxide
- Lauroyl peroxide
- Succinyl peroxide
- Tertiary butyl hydroperoxide and the like.

The solvent-diluent employed in dissolving the peroxide catalyst and polymerizable compound of the maleic acid type, and for preparing solutions of the vinyl compound may be any alkane, cycloaliphatic, or monocyclic aromatic hydrocarbon or mixtures thereof which is inert, i. e., unreactive with the copolymerizable components. The nature or character of the solvent-diluent is immaterial so long as it effects solution and is inert. As examples of such solvent-diluents which are merely illustrative, the following may be mentioned:

| | Boiling point ° C. at 760 mm. |
|---|---|
| Heptane | 98.4 |
| 2-methylhexane | 90.4 |
| 3-methylhexane | 90–92 |
| 3,3-dimethylpentane | 87.0 |
| Ethylpentane | 96.0 |
| Octane | 125.8 |
| 2-methylheptane | 118.0 |
| 2,5-dimethylhexane | 109.2 |
| Nonane | 149.5 |
| Decane | 173.0 |
| 1,2-dimethylcyclohexane (hexahydro-o-xylene) | 124.0 |
| Ethylmethylcyclopentane | 124.0 |
| Benzene | 80.2 |
| Toluene | 110.8 |
| o-Xylene | 142.0 |
| m-Xylene | 139.0 |
| p-Xylene | 138.0 |
| Ethylbenzene | 136.5 |
| 1,2,4-trimthylbenzene | 169.0 |
| Propylbenzene | 157.0 |
| 1,3-ethylmethylbenzene | 158.0 |
| p-Diethylbenzene | 183.0 |

Any of the foregoing hydrocarbons may be used as such or mixtures thereof or the individual hydrocarbon solvent may be mixed in equal proportions with a lower alkyl ketone, such as acetone or methyl ethyl ketone, etc. The foregoing polymerization procedure may be conducted, if desired, in a solvent in which the copolymer is soluble, such as a lower alkyl ketone, e. g., acetone, methyl ethyl ketone, isopropyl methyl ketone, and the like, and isolated by precipitation into a non-solvent, such as any one of the hydrocarbons listed above.

In order to better disclose the invention in detail, the following examples are furnished. It is to be understood, however, that these examples are illustrative only and are not intended to limit the scope of the invention.

*Example I*

A 2-liter flask was equipped with a stirrer, gas inlet tube (10 mm.) extending below the liquid level, an internal thermometer, a Dry Ice cooled "cold finger" which functions as a reflux condenser, and a steam bath. A tank of methyl vinyl ether was connected via a benzene-filled bubbler to the gas inlet tube. A similar bubbler was connected to the outlet of the "cold finger" to indicate the amount of gas passing through the system unabsorbed.

100 grams of maleic anhydride were dissolved in 1000 ml. of benzene and filtered into the flask. 2 grams of benzoyl peroxide were then added. With moderate stirring, this solution was brought to reflux, the internal temperature being approximately 80° C. Methyl vinyl ether was passed in at the maximum rate possible without appreciable loss through the exit bubbler (15 grams/hour). Within 10 to 15 minutes the solution became cloudy indicating that polymerization had started. At this point the internal temperature was rapidly lowered to the desired point (if other than 80° C.) by external cooling and adjustment of the steam bath. The introduction of methyl vinyl ether was continued while the "cold finger" was kept at about $-30°$ C. As the slurry becomes thicker, it is necessary to increase the stirring rate. Interruption of the flow of methyl vinyl ether is to be avoided since plugging of the inlet tube would result. When the reaction nears completion and little methyl vinyl ether is being absorbed, the internal temperature begins to drop due to the increased methyl vinyl ether concentration and consequently reduces the boiling point of the benzene solution. At this point the reaction is considered complete and the methyl vinyl ether tank shuts off. Total time involved was 4 to 5 hours.

The copolymer-benzene slurry was filtered through a Buchner funnel, washed with 500 ml. of fresh benzene, and pressed dry as possible. The filter cake containing about 2 parts of benzene per part of dry polymer was dried in vacuo (60° C./50 mm.) overnight.

1 gram of the dried polymer dissolved in 100 ml. of methyl ethyl ketone has a specific viscosity of 0.18. The viscosity is determined by means of an Ostwald-Fenske viscosimeter.

*Example II*

A charge consisting of 350 grams of maleic anhydride, 1750 grams of benzene, and 7 grams of benzoyl peroxide was brought to reflux in a 5-liter flask. With vigorous stirring a solution of 286 grams of ethyl vinyl ether in 440 grams of benzene was added over a 110-minute period. The resulting polymer slurry was filtered, washed with benzene, and dried in vacuum. It amounts to 501 grams (83% of theory). The specific viscosity of the copolymer (1 gram in 100 ml. of methyl ethyl ketone) is 0.13.

*Example III*

A charge consisting of 175 grams of phenyl maleic anhydride, 250 grams of ethylpentane, 850 grams of benzene, and 1.75 grams of lauroyl peroxide was brought to reflux in a 5-liter flask. With vigorous stirring a solution of 86 grams of isopropyl vinyl ether, 100 grams of ethylpentane and 300 grams of benzene was added over a 2-hour period. The copolymer was worked as usual and has a specific viscosity of 0.38.

*Example IV*

Example I was repeated with the exception that methyl vinyl ether was replaced by vinyl chloride. The specific viscosity of the copolymer is 0.25.

*Example V*

A solution consisting of 196 grams (2.0 mols) of maleic anhydride, 4 grams of benzoyl peroxide, and 2000 ml. of benzene was filtered into a 5-liter reaction flask. At reflux, by steam heating, a solution of 214 grams (2.1 mols) of methoxyethyl vinyl ether in 500 ml. of benzene was added over 35 minutes. Steam was cut off as soon as the reaction "took hold," and then resumed for an additional 30 minutes when addition was complete. The copolymer, which precipitated out during reaction, stuck to the flask. After cooling the benzene was decanted off and the copolymer mass dissolved in 2000 ml. of c. p. acetone. This solution was run into 5 liters of stirred carbon tetrachloride. The fibrous precipitate was dried as usual to give 357 grams of slightly pink copolymer. The specific viscosity of the copolymer is 0.35.

*Example VI*

A solution consisting of 133 grams of maleic anhydride, 2.7 grams of benzoyl peroxide, and 700 ml. of benzene was filtered into a 2-liter flask equipped as in the previous examples. To the refluxing, stirred solution was added a solution of 176 grams (1.4 mols) of cyclohexyl vinyl ether in 300 ml. of benzene over a 30-minute period. Refluxing was continued for an additional 15 minutes. The cooled slurry contained some fairly large lumps of material. The product was worked up as usual. The specific viscosity of the copolymer is 0.24.

I claim:

1. The process of preparing low molecular weight copolymers of vinyl compounds with polymerizable dicarboxylic acid compounds which comprises heating to reflux a solution of an $\alpha,\beta$-unsaturated dicarboxylic acid compound selected from the class consisting of those corresponding to the general formulae:

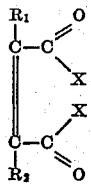

and

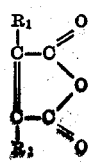

wherein $R_1$ and $R_2$ are members selected from the class consisting of hydrogen, halogen, lower alkyl, aryl, and aralkyl groups, and X represents a member selected from the class consisting of oxyalkyl and oxyaryl groups, in at least one inert solvent-diluent of the group consisting of lower alkyl ketones, alkyl and monocyclic aryl hydrocarbons in the presence of an organic peroxide, adding a polymerizable vinyl compound containing a $>C=CH_2$ group at such a rate that the said $\alpha,\beta$-unsaturated dicarboxylic acid compound is in substantially large excess over the said polymerizable vinyl compound while maintaining the temperature at about reflux until copolymerization is complete, and filtering, washing, and drying the copolymer, said solvent-diluent having a boiling point higher than the said polymerizable vinyl compound.

2. The process of preparing copolymers of vinyl compounds with polymerizable dicarboxylic acid compounds which comprises heating to reflux a solution of maleic anhydride in at least one inert solvent-diluent of the group consisting of lower alkyl ketones, alkyl and monocyclic aryl hydrocarbons in the presence of an organic peroxide, adding a polymerizable vinyl compound containing a $>C=CH_2$ group at such a rate that the said $\alpha,\beta$-unsaturated dicarboxylic acid compound is in substantially large excess over the said polymerizable vinyl compound while maintaining the temperature at about reflux until copolymerization is complete, and filtering, washing, and drying the copolymer, said solvent-diluent having a boiling point higher than the said polymerizable vinyl compound.

3. The process according to claim 1, wherein the $\alpha,\beta$-unsaturated dicarboxylic anhydride is chloromaleic anhydride.

4. The process according to claim 1, wherein the $\alpha,\beta$-unsaturated dicarboxylic anhydride is phenyl maleic anhydride.

5. The process according to claim 1, wherein the $\alpha,\beta$-unsaturated dicarboxylic anhydride is ethyl maleic anhydride.

6. The process according to claim 1, wherein the $\alpha,\beta$-unsaturated dicarboxylic anhydride is benzyl maleic anhydride.

7. The process according to claim 1, wherein the $\alpha,\beta$-unsaturated dicarboxylic anhydride is dibenzyl maleic anhydride.

8. The process according to claim 2, wherein the polymerizable vinyl compound containing a $>C=CH_2$ group is methyl vinyl ether.

9. The process according to claim 2, wherein the polymerizable vinyl compound containing a $>C=CH_2$ group is ethyl vinyl ether.

10. The process according to claim 2, wherein the polymerizable vinyl compound containing a $>C=CH_2$ group is isopropyl vinyl ether.

11. The process according to claim 2, wherein the polymerizable vinyl compound containing a $>C=CH_2$ group is isobutyl vinyl ether.

12. The process according to claim 2, wherein the polymerizable vinyl compound containing a $>C=CH_2$ group is vinyl chloride.

References Cited in the file of this patent

UNITED STATES PATENTS

| | | |
|---|---|---|
| 2,286,062 | Condo et al. | June 9, 1942 |
| 2,565,147 | Pfluger | Aug. 21, 1951 |
| 2,637,712 | Upton | May 5, 1953 |
| 2,675,370 | Barrett | Apr. 13, 1954 |